United States Patent [19]
Varsik et al.

[11] Patent Number: 5,380,155
[45] Date of Patent: Jan. 10, 1995

[54] COMPRESSOR STATOR ASSEMBLY

[75] Inventors: David A. Varsik, Manchester; Jeffrey S. LeShane, Glastonbury, both of Conn.; Brian Selfors, Boston, Mass.

[73] Assignee: United Technologies Corporation, Hartford, Conn.

[21] Appl. No.: 203,958

[22] Filed: Mar. 1, 1994

[51] Int. Cl.⁶ .............................................. F04D 29/60
[52] U.S. Cl. ................................................. 415/209.3
[58] Field of Search .............. 415/208.1, 208.2, 209.1, 415/209.2, 209.3, 190

[56] References Cited

U.S. PATENT DOCUMENTS

| | | | |
|---|---|---|---|
| 2,640,679 | 6/1953 | Wheatley | 415/209.4 |
| 3,319,930 | 5/1967 | Howald | 415/190 |
| 4,655,682 | 4/1987 | Kunz et al. | 415/119 |

*Primary Examiner*—John T. Kwon
*Attorney, Agent, or Firm*—Edward L. Kochey, Jr.

[57] ABSTRACT

Stator vanes (22) are potted within pockets (38) in composite inner shroud sections (36). The pocket depth is only that required for bond strength and vane damping. Ribs (48) extend inwardly and are adhesively bonded to the seal support ring (32,34) which carries abradable seal surface.

8 Claims, 3 Drawing Sheets

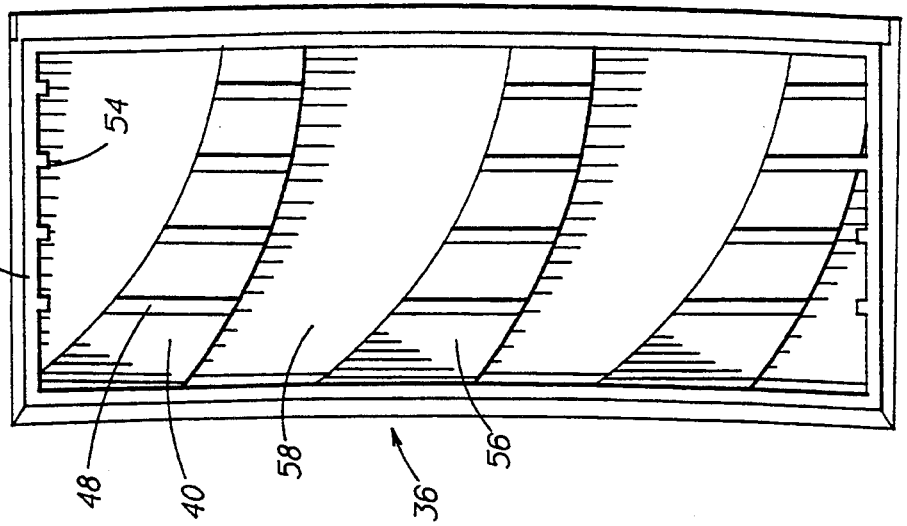
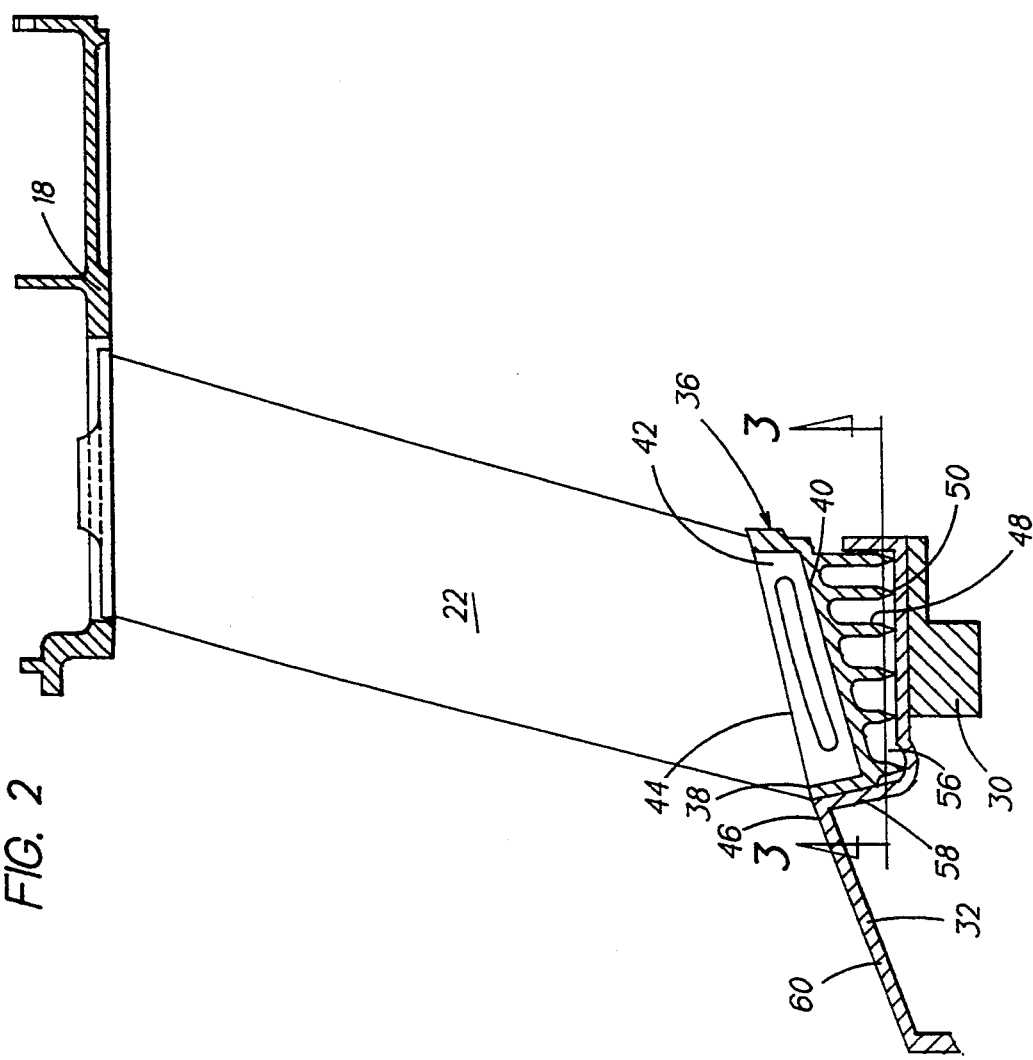

COMPRESSOR STATOR ASSEMBLY

TECHNICAL FIELD

The invention relates to low pressure compressors for gas turbine engines and in particular to vanes and the inner shroud therefore.

BACKGROUND OF THE INVENTION

Gas turbine engines for aircraft require a compressor in a gas turbine. Light weight of the gas turbine engine is important. Usually the compressor includes a low pressure compressor and a high pressure compressor. Low temperature exists in a low pressure compressor making it possible to use many composite materials.

U.S. Pat. No. 4,655,682 issued Apr. 7, 1987 to Cleon V. Kunz and Dennis H. Jones shows a composite inner shroud for low pressure compressor. The inner ends of the compressor vanes are potted within pockets in this inner shroud. A support structure to which the shroud is secured on its shroud edge carries on its inside surface an abradable seal. Knife edges on the turbine rotor interact with the abradable seal to form a flow restriction, sealing against bypass airflow.

When the compressor rotor is radially remote from the airflow path a deeper pocket is used than would be required for bond strength and vibration damping. This pocket is filled with potting compound, thereby adding weight to the compressor. This remote location tends to exist at the axial extreme of the compressor.

There the shroud is adhesively bonded to the support structure, this occurring along contacting surfaces. While substantial surface area is achieved for the bonding, there is a potential of peeling apart of the two surfaces upon failure at one location.

SUMMARY OF THE INVENTION

The stator assembly defines the axial flowpath of a compressor. A seal support carries an abradable air seal secured to the inwardly facing surface. This seal interacts with knife edges located on the compressor rotor.

There is an outer vane support structure to which a circumferential row of vanes are rigidly secured at the outer ends. A plurality of arcuate inner shroud sections are circumferentially located adjacent one another. Each has a plurality of vane receiving pockets with the inner ends of the vanes located within the pocket. The vanes in the pocket are imbedded in a potting compound such as silicon rubber.

Under the bottom of each pocket there are plurality of circumferentially extending ribs integral with the inside edge of each bottom, and which extend radially inward therefrom. These ribs are adhesively bonded to the seal support.

The first stage vane assembly has a seal support in the form of a ring which also forms a bounding portion of the flowpath upstream of the vane. A composite seal support ring is used here. For a higher stage in the compressor an aluminum seal support formed of ring segments is made with a flat band of aluminum.

Each of the plurality of shroud sections has an axially and radially extending wall at each circumferential end. These end walls are also adhesively bonded to the seal support and may include ribs of their own.

BRIEF DESCRIPTION OF THE DRAWINGS

FIG. 2 is a view of the first stage vane stator assembly;

FIG. 3 is a view taken along 3—3 of FIG. 2 showing the underside of the shroud.

DESCRIPTION OF THE PREFERRED EMBODIMENT

Figure 1:
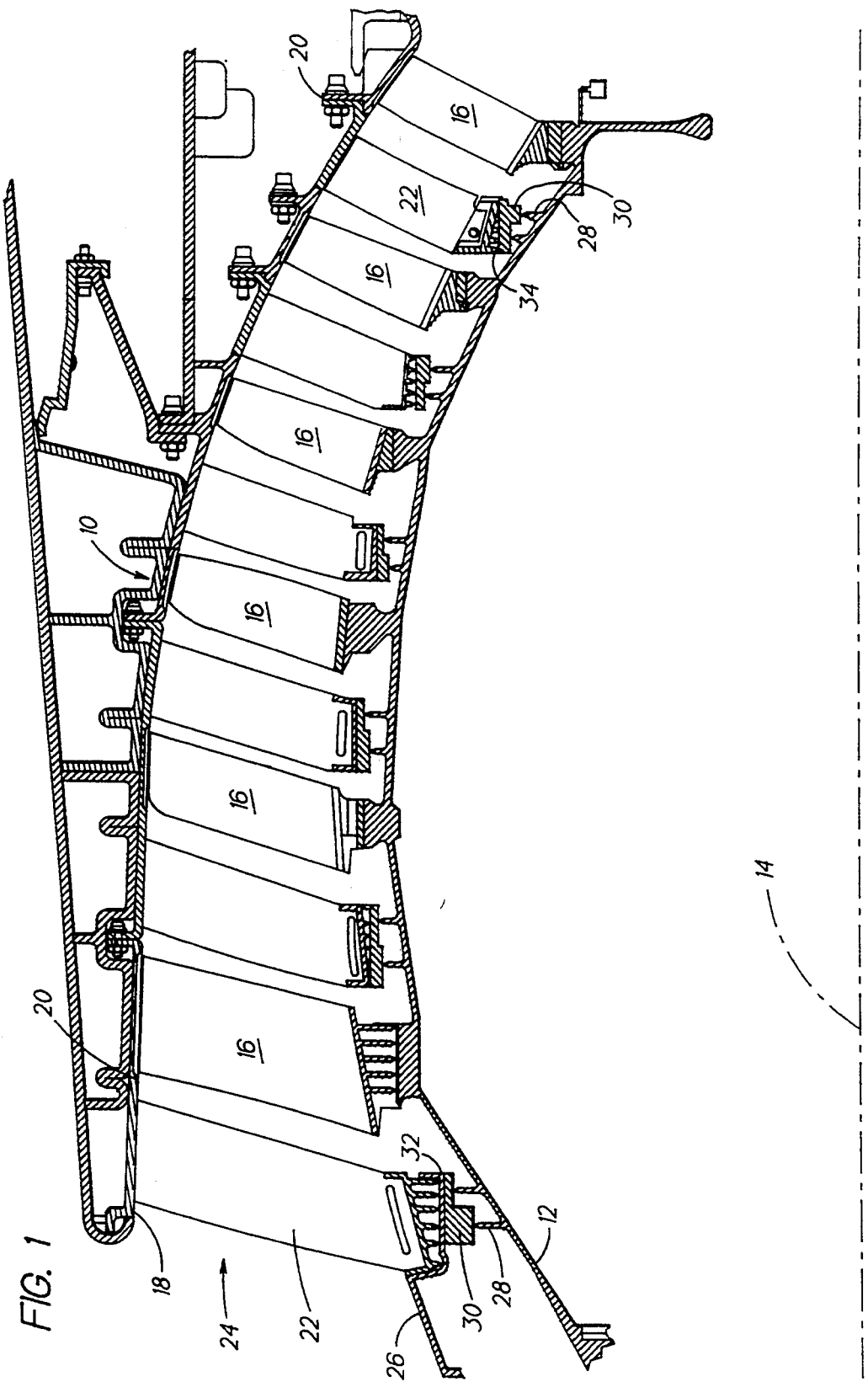
FIG. 1 is a partial section through a low pressure compressor of a gas turbine engine.

Low pressure compressor 10 of FIG. 1 includes a rotor 12 rotatable about centerline 14 and carrying a plurality of compressor blades 16. The stator assembly 18 includes an outer vane support structure 20 to which the outer end of vanes 22 are rigidly connected. An axial gas flowpath 24 is defined between the outer vane support structure 18 and the bounding surface 26 at the inward side.

Knife edges 28 on rotor 12 are located adjacent abradable seal surfaces 30 for sealing against air passage. These seal surfaces are secured to the radially inward facing surface of seal support rings 32 or 34.

The first stage stator assembly with support ring 32 is better seen in FIGS. 2 and 3. A plurality of arcuate inner shroud sections 36 have vane receiving pockets 38, each pocket having a bottom 40. Vane 22 extends into pocket 38 with the pocket then filled with a potting compound such as silicon rubber. The surface 44 is formed substantially flush with surface 46 which is the gas path bounding surface formed by an upstream extension of seal support 32. The depth of this pocket is only sufficient to supply sufficient vane to shroud bond strength and damping of the vane.

Each bottom 40 has a plurality of circumferentially extending ribs 48 integral with the radial inside of the bottom and which extend radially inward from the vanes. The radially inward end of each rib 50 is adhesively bonded to the seal support ring at the bond location.

Each rib is bonded to the seal support ring using an epoxy film adhesive. The adhesive actually bonds not only underneath the ribs but forms a fillet along the edge. This actually forms a stronger seal than the surface contact seal of the prior art since the fillet may take load in shear. Furthermore any peeling that does occur does not spread throughout the entire structure. Each shroud section 36 also has an axially and radially extending end wall 52 which is also adhesively bonded to the support ring. Additional ribs 54 are located on the end walls to increase bond strength.

The location of the air flowpath is dictated by the aerodynamics, while the preferred location of the rotor structure is dictated by the structural design of the rotor. Particularly at the first stage and last stage of a compressor section there can be substantial radial distance between the rotor and the air flowpath. In the prior art the pocket was made sufficiently deep to absorb this difference. Here the pocket is made only deep enough to supply the required bond strength and dampening, and then of course filled with the potting compound. The ribs 48 have open spaces 56 therebetween resulting in a lower weight overall. The spaces 58 between the pockets are of course still open as they were in the prior art.

Seal support ring 32 is formed of a composite material, preferably a laminated structure comprising a plurality of polyamide fabric plies impregnated with thermosetting epoxy resin. This seal support ring extends radially outward at extension 58 and then upstream with part 60 forming the bounding surface 46 of the air flowpath.

Figure 4:
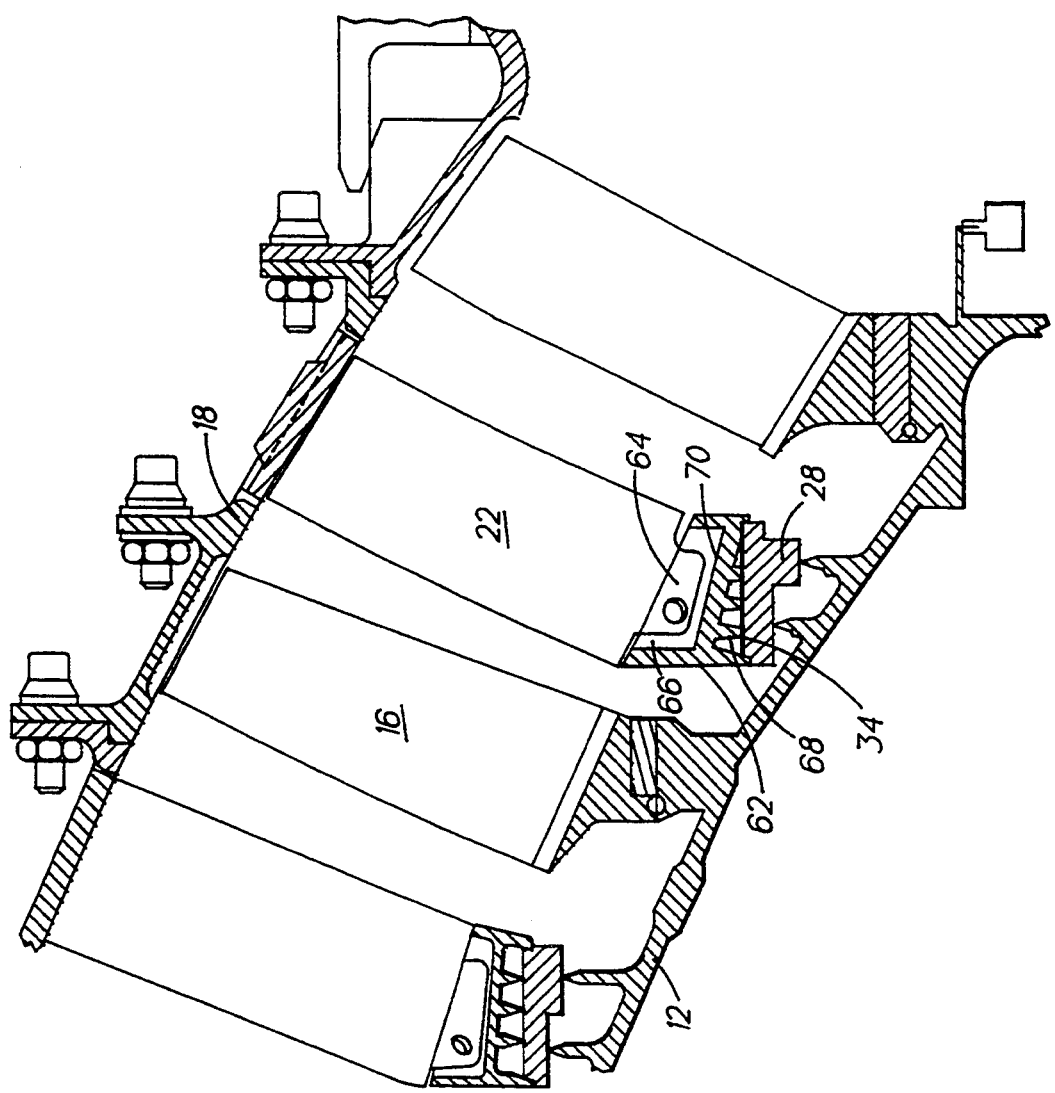
FIG. 4 is a view of a later stage vane stator assembly.

This stator assembly at a downstream location in the compressor with seal support 34 is better shown in FIG. 4. Here the seal support is a segmented circular ring formed of flat aluminum, or more precisely cylindrical segments. In a similar manner a plurality of shroud sections 62 receive the end 64 of vane 22 and are filled with silicon rubber 66 to supply the necessary strength. Inwardly and circumferentially extended ribs 68 are located on the bottom 70 of each shroud section 62. The aluminum support ring segments are adhesively secured to the ribs and the abrasive seal 20 is secured to the inside surface of the seal support ring.

A lighter weight structure is obtained which has a stronger bond.

We claim:

1. A stator assembly defining a compressor axial flowpath comprising:
   a full ring seal support ring, having a radially outwardly facing surface and a radially inwardly facing surface;
   an abradable air seal secured to the radially inwardly facing surface of said seal support ring;
   an outer vane support structure;
   a circumferential row of vanes, the outer end of each vane rigidly secured to said outer vane support structure;
   a plurality of arcuate inner shroud sections, each having a plurality of vane receiving pockets, each pocket having a bottom;
   said vanes extending into said pockets and imbedded in a potting compound within said pockets;
   a plurality of circumferentially extending ribs integral with the radial inside of each bottom and extending radially inwardly therefrom; and
   the radially inward end of said ribs adhesively bonded to said seal support ring at a bond location.

2. A stator assembly as in claim 1 further comprising:
   a radially extending end wall at each circumferential end of each of said plurality of shroud sections; and
   said end walls also adhesively bonded to said seal support ring.

3. A stator assembly as in claim 2 further comprising:
   a plurality of radially extending ribs integral with each end wall.

4. A stator assembly as in claim 1 wherein:
   said seal support ring is formed of a composite, and extends radially outward upstream of said bond location, and then upstream forming the bounding surface of the air flowpath.

5. A stator assembly as in claim 1 further comprising:
   said seal support ring formed of a flat aluminum ring.

6. A stator assembly defining a compressor axial flowpath comprising:
   an arcuate seal support, having a radially outwardly facing surface and a radially inwardly facing surface;
   an abradable air seal secured to the radially inwardly facing surface of said seal support;
   an outer vane support structure;
   a circumferential row of vanes, the outer end of each vane rigidly secured to said outer vane support structure;
   a plurality of arcuate inner shroud sections, each having a plurality of vane receiving pockets, each pocket having a bottom;
   said vanes extending into said pockets and imbedded in a potting compound within said pockets;
   a plurality of circumferentially extending ribs integral with the radial inside of each bottom and extending radially inwardly therefrom; and
   the radially inward end of said ribs adhesively bonded to said seal support at a bond location.

7. A stator assembly as in claim 6 wherein:
   said arcuate support is formed of a composite full ring, and extends radially outward upstream of said bond location, and then upstream forming the bounding surface of the air flowpath.

8. A stator assembly as in claim 6 further comprising:
   said arcuate seal support formed of a plurality of segments forming a ring; and
   each segment is formed of an arcuate flat aluminum.

* * * * *